(12) United States Patent
Ramaswamy

(10) Patent No.: US 9,609,305 B1
(45) Date of Patent: Mar. 28, 2017

(54) FEATURE-BASED RECTIFICATION OF STEREO CAMERAS

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 347 days.

(21) Appl. No.: 13/801,239

(22) Filed: Mar. 13, 2013

(51) Int. Cl.
*H04N 13/02* (2006.01)

(52) U.S. Cl.
CPC ............................... *H04N 13/0246* (2013.01)

(58) Field of Classification Search
CPC ..... H04N 13/02; H04N 13/0246; G06T 7/002
USPC .......................................................... 348/47
See application file for complete search history.

(56) References Cited

U.S. PATENT DOCUMENTS

| | | | | |
|---|---|---|---|---|
| 5,574,511 A * | 11/1996 | Yang | ...................... | H04N 5/272 348/586 |
| 6,741,757 B1 * | 5/2004 | Torr | ................... | G06K 9/00154 382/285 |
| 8,237,730 B1 * | 8/2012 | Anderson | ............... | G06T 15/50 345/426 |
| 8,619,148 B1 * | 12/2013 | Watts | ..................... | G06T 5/006 348/218.1 |
| 2006/0029256 A1 * | 2/2006 | Miyoshi | ............... | G06K 9/2036 382/104 |
| 2006/0056727 A1 * | 3/2006 | Jones | ....................... | G06K 9/32 382/276 |
| 2006/0215903 A1 * | 9/2006 | Nishiyama | ............... | G06K 9/32 382/154 |
| 2007/0058838 A1 * | 3/2007 | Taniguchi | .......... | G06K 9/00664 382/103 |
| 2009/0219283 A1 * | 9/2009 | Hendrickson | ...... | H04N 13/0022 345/420 |
| 2010/0220921 A1 * | 9/2010 | Blake | ................. | G06K 9/00234 382/154 |
| 2010/0225743 A1 * | 9/2010 | Florencio | ........... | H04N 13/0014 348/46 |
| 2011/0074931 A1 * | 3/2011 | Bilbrey | ................ | H04N 5/2258 348/48 |

(Continued)

FOREIGN PATENT DOCUMENTS

WO    WO 2011081642 A1 *   7/2011    ............. G06T 7/002

*Primary Examiner* — Jay Patel
*Assistant Examiner* — Marnie Matt
(74) *Attorney, Agent, or Firm* — Polsinelli LLP

(57) ABSTRACT

Depth information can be used to assist with image processing functionality, such as various calibration approaches to determine and correct for misalignments between cameras. In at least some embodiments, depth information obtained from stereo imaging or distance sensing, for example, can be used to segment an image or frame of video into at least a foreground object and a background object. Once the foreground and background object has been determined, information about that objects can be used to determine a mapping, and once a subsequent stereoscopic image is captured using the cameras, the mapping can be applied to each image to account for misalignment effects due to a misaligned stereo camera pair before providing the stereoscopic image for display.

26 Claims, 9 Drawing Sheets

(56) References Cited

U.S. PATENT DOCUMENTS

| | | | |
|---|---|---|---|
| 2011/0080466 A1* | 4/2011 | Kask | G06T 7/0022 348/43 |
| 2011/0117958 A1* | 5/2011 | Kim | G03B 35/10 455/556.1 |
| 2012/0249751 A1* | 10/2012 | Zhang | G06T 7/002 348/47 |
| 2013/0010073 A1* | 1/2013 | Do | H04N 13/0214 348/46 |
| 2013/0329015 A1* | 12/2013 | Pulli | G06T 7/0075 348/47 |
| 2015/0055821 A1* | 2/2015 | Fotland | G06K 9/3241 382/103 |
| 2015/0077323 A1* | 3/2015 | Ramaswamy | G06F 3/012 345/156 |

\* cited by examiner

FIG. 6(a)      FIG. 6(b)
FIG. 6(c)
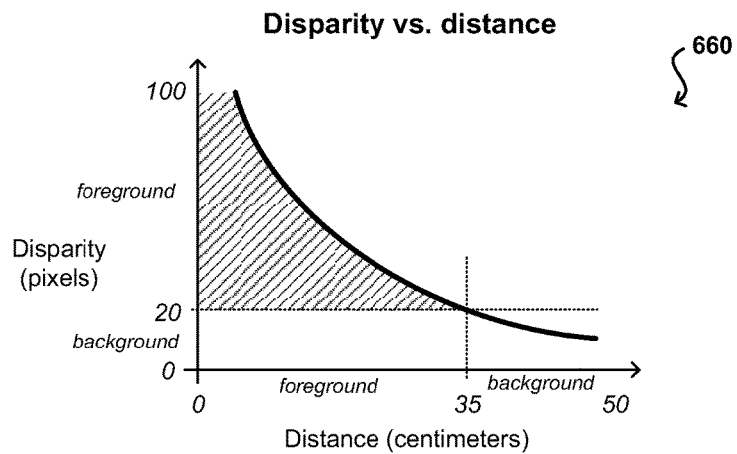
FIG. 6(d)

FEATURE-BASED RECTIFICATION OF STEREO CAMERAS

BACKGROUND

People are increasingly interacting with computers and other electronic devices in new and interesting ways. For example, mobile devices are increasingly offering multiple high quality cameras that enable additional types of functionality. In some devices, two of these high quality cameras can be used to provide three-dimensional (3D) image capture, for both still and video imaging. Often, these cameras are initially rectified using some static calibration procedure, which requires the optical axes of each camera to be parallel, i.e., the optical axes are aligned in yaw, pitch, and roll. When using two distinct cameras, however, it is impossible to perfectly align the lens elements, such that a software adjustment is also required. Further, over a period of time as the device is being used, the stereo cameras can get misaligned (due to shocks or natural degradation).

BRIEF DESCRIPTION OF THE DRAWINGS

Various embodiments in accordance with the present disclosure will be described with reference to the drawings, in which:

FIGS. 6(a), 6(b), 6(c), and 6(d) illustrate disparity information that can be leveraged in accordance with various embodiments;

DETAILED DESCRIPTION

Systems and methods in accordance with various embodiments of the present disclosure may overcome one or more of the aforementioned and other deficiencies experienced in conventional approaches to capturing image information using an electronic device. In particular, various embodiments enable the capture of three-dimensional (3D) or stereoscopic image data using a pair of cameras or camera sensors positioned on a computing device. Approaches enable the cameras to be aligned through software mechanisms in order to enable the captured stereo images to include a proper amount of disparity or depth information, as well as to have objects aligned in images captured by each camera. Various calibration processes are presented that enable any misalignment between the cameras to be determined, which can then be addressed when processing images captured by those cameras.

Approaches in accordance with various embodiments attempt to identify one or more foreground and background objects based on one or more sources of distance information, and analyze the portions of the images (including frames or portions of video) corresponding to the foreground and background object(s) to attempt to identify one or more feature points from the representation of the object(s) in the images. In at least some embodiments, a computing device with at least two cameras having at least partially overlapping fields of view can attempt to perform stereo imaging, where differences in disparity information can help to determine which portion(s) of the images correspond to objects that are closer to the cameras (e.g., foreground objects) than objects further from the camera (e.g., background objects). Similar information can be obtained using ultrasonic sensors, infrared flash intensity analysis, and other such relevant distance-determining techniques. Once the foreground and background object(s) have been located, feature points for the objects can be determined, and the feature points can be used in various calibration processes to enable any misalignment between cameras to be determined, which can then be addressed when processing images captured by those cameras. Various other applications, processes, and uses are presented below with respect to the various embodiments.

Figure 1:
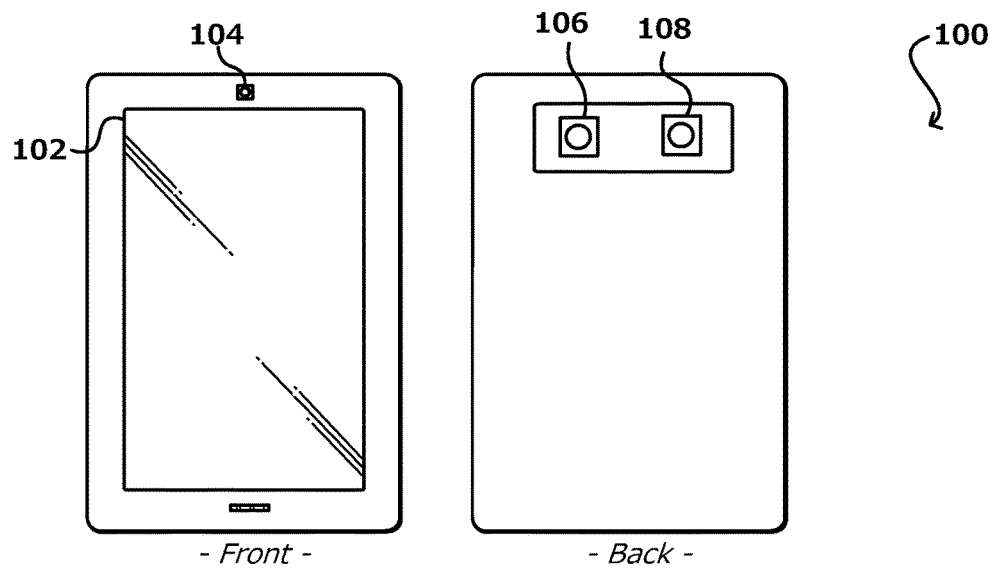
FIG. 1 illustrates front and back views of an example computing device including a pair of cameras for 3D imaging that can be utilized in accordance with various embodiments.

Many electronic and computing devices offer stereoscopic or three-dimensional (3D) imaging using at least one pair of high resolution matched cameras. For example, FIG. 1 illustrates front and back views of an example electronic device 100 wherein a front of the device includes a display screen 102 and other input elements, such as a front-facing camera 104 for video chat or other such purposes. The display can be, for example, a glasses-free 3D capable display, a display capable of presenting glasses-assisted 3D image information, or a conventional 2D display, among other such options. The device also includes a pair of matched cameras 106, 108 on a back side of the device. It should be understood that terms such as "front" and "back" are used for purposes of explanation and are not intended to require absolute orientations unless otherwise stated. These cameras (106, 108) are separated a distance sufficient to enable stereoscopic imaging over at least a determined distance, each with a determined field of view that at least partially overlaps. The stereo cameras typically are relatively high resolution cameras (e.g., 5.0 MP or above for conventional devices), such as CMOS or CCD cameras, among other such options. In some embodiments the stereo cameras each come with auto-focusing mechanisms, enabling the cameras to focus to different depths.

Figure 2:
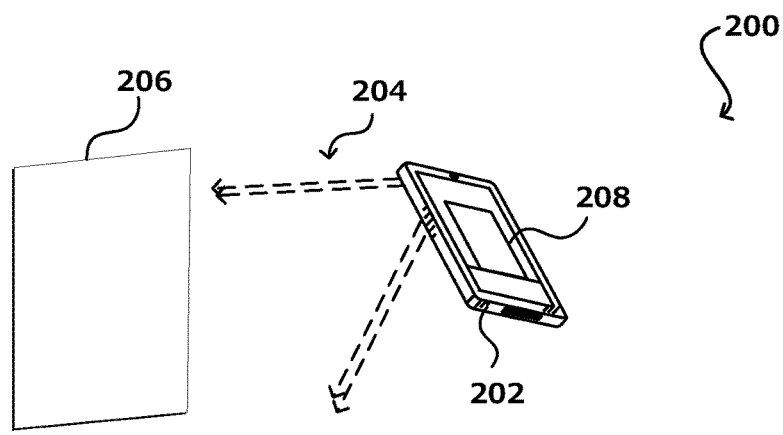
FIG. 2 illustrates an example of a computing device capturing an image of an object in accordance with an embodiment.

When capturing a stereoscopic ("stereo") image, each of the pair of cameras captures an image at approximately the same time. The offset of the cameras will cause the location of objects in each image to be slightly offset, where the amount of offset is a factor of the separation of the cameras and the distance from the cameras to the objects. This varying offset with distance, otherwise known as disparity, provides the perception of depth in the image when the images are combined using a stereovision process. As illustrated in the example situation 200 of FIG. 2, a portable computing device 202 with a pair of stereo cameras on the back can be pointed at an object 206 such that the object is within the field of view 204 of the cameras. Since a display screen 208 is on the opposite side of the device 202, a user holding the device can view the stereo image being captured, assuming the display is capable of rendering the stereo information for a two- or three-dimensional display. The user thus can view a three-dimensional view of the object 206 as captured by the cameras and displayed on the display screen 208. It should be understood that a stereo image can be a combined image or can include a rendering of separate images captured by each of the stereo cameras in different embodiments.

In order for the image of the object 206 to have the desired appearance in the captured stereo image, the cameras have to be aligned such that the object is properly positioned in each image to provide the desired depth information. As mentioned, the cameras can be aligned mechanically to the extent possible and/or practical. There still can be at least some misalignment, however, such that it can be desirable to compensate for the misalignment through software and/or image processing. A static approach can use a calibration object, such as the calibration grid to enable points to be located in an image captured by each camera, or some other static calibration approach. However, a potential problem with using a static calibration approach is that such a calibration object may not always be available. Other approaches can include rectifying images captured with misaligned stereo cameras based at least upon using the computation of the fundamental matrix. However, without recognition of the presence of a foreground and a background object separated by a threshold distance, the computation of the fundamental matrix is unreliable.

Figure 3:
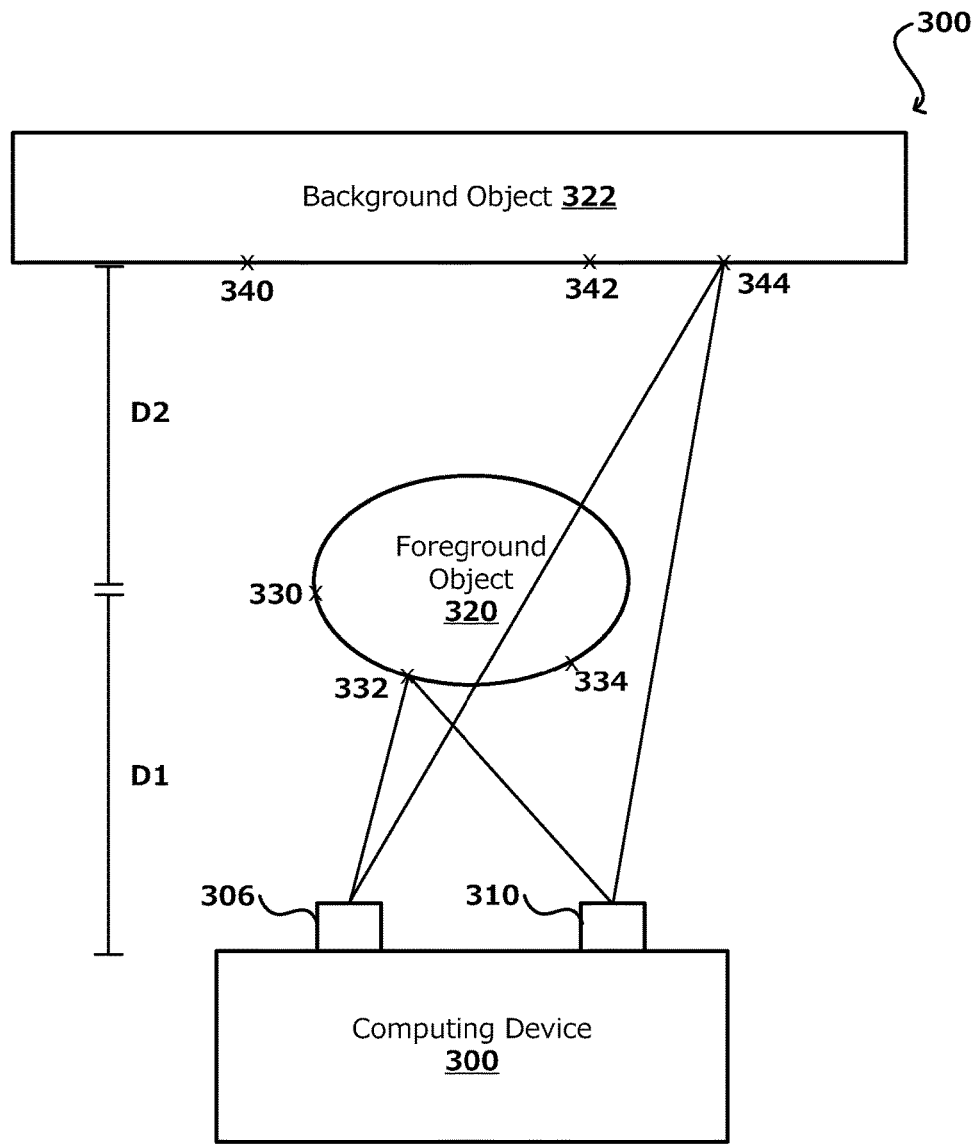
FIG. 3 illustrates an example situation where disparity information can be leveraged for rectifying or otherwise accounting for variations in images captured by a pair of stereo cameras in accordance with various embodiments.

In accordance with various embodiments, online (or real-time) software and/or image processing can be used to compensate for the misalignment, without the use of such dedicated calibration objects. Accordingly, one or more calibration/rectification approaches, such as one involving the fundamental matrix, can be implemented to compensate for at least some misalignment between the cameras. In such approaches, one or more (in some cases preferably two) feature rich objects (e.g., a face) separated by a predetermined distance can be used to reliable compute the fundamental matrix. For example, FIG. 3 illustrates an example situation 300 where disparity information can be leveraged for rectifying or otherwise accounting for variations in images captured by a pair of stereo cameras by being used to identify objects separated by a threshold distance. As shown in situation 300, a computing device including a pair of matched cameras (306, 310) is used to enable stereo image capture. A foreground object 320 is separated from the computing device by a distance D1 and a background object 322 is separated from the foreground object by a distance D2, where D1 and D2 are predetermined threshold distances. Example of such distances are described further herein. In accordance with various embodiments, the foreground object can be, for example, a face, and the background object can be, for example, a painting. As described in various embodiments, the objects can be any object where one or more points ("feature points") can be used to distinguish each object from other objects in the image.

The foreground object, in this example, includes feature points 330, 332, 334, and the background object, in this example, includes feature points 340, 342, and 344. It should be noted that each object can include more or fewer feature points. In accordance with various embodiments, computation of the fundamental matrix is based in part on the feature points determined from a first object (e.g., the foreground object) and a second object (e.g., the background object), where the objects are separated by a threshold distance (e.g., D2). As described herein, approaches in accordance with various embodiments illustrate a number of approaches to reliably detect feature rich objects (such as objects 320 and 322) that are separated by a threshold distance.

Figure 4A:
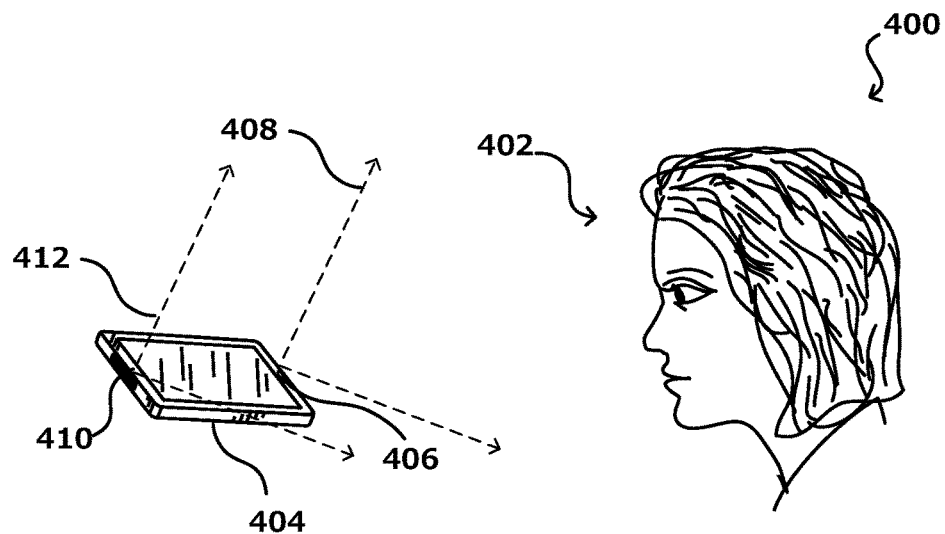
FIGS. 4(a) and 4(b) illustrate an example of a user capturing an image using a pair of misaligned stereo cameras in accordance with an embodiment.
Figure 4B:

For example, FIGS. 4-7 describe approaches in which stereo disparity can be used to reliable detect feature rich objects that are separated by a threshold distance. FIG. 4(*a*) illustrates an example situation 400 wherein a user 402 is attempting to capture video using one or more cameras of a computing device 404. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, and the like. Further, while the cameras in this example are "front-facing" cameras, as may be used for purpose such as video conferencing, it should be understood that "rear-facing" cameras or cameras in other locations or orientations can be used as well within the scope of the various embodiments.

In this example, the computing device includes a pair of matched cameras (406, 410) having substantially overlapping fields of view (408, 412) and having parallel optical axes in order to enable stereo image capture. It should be understood, however, that a single camera could be used to capture images and/or video as well within the scope of the various embodiments. Each camera in the stereo imaging example will capture an image of the user 402 from a slightly different position, which will result in the user appearing in a slightly different position in each image. This offset is often referred to as the amount of "disparity" between the images. When the images are combined, a stereo image 420 such as that illustrated in FIG. 4(*b*) can be rendered, which can utilize stereoscopic glasses or other such technology to cause each of the user's eye to see a different portion of each image, causing objects in the image to appear to be at different depths, a function of their relative amounts of disparity. As illustrated in FIG. 4(*b*), there is a greater amount of disparity, or offset, of the location of the user between the two images than of objects in the background. This difference can be utilized advantageously to compensate for the misalignment.

Figure 5:
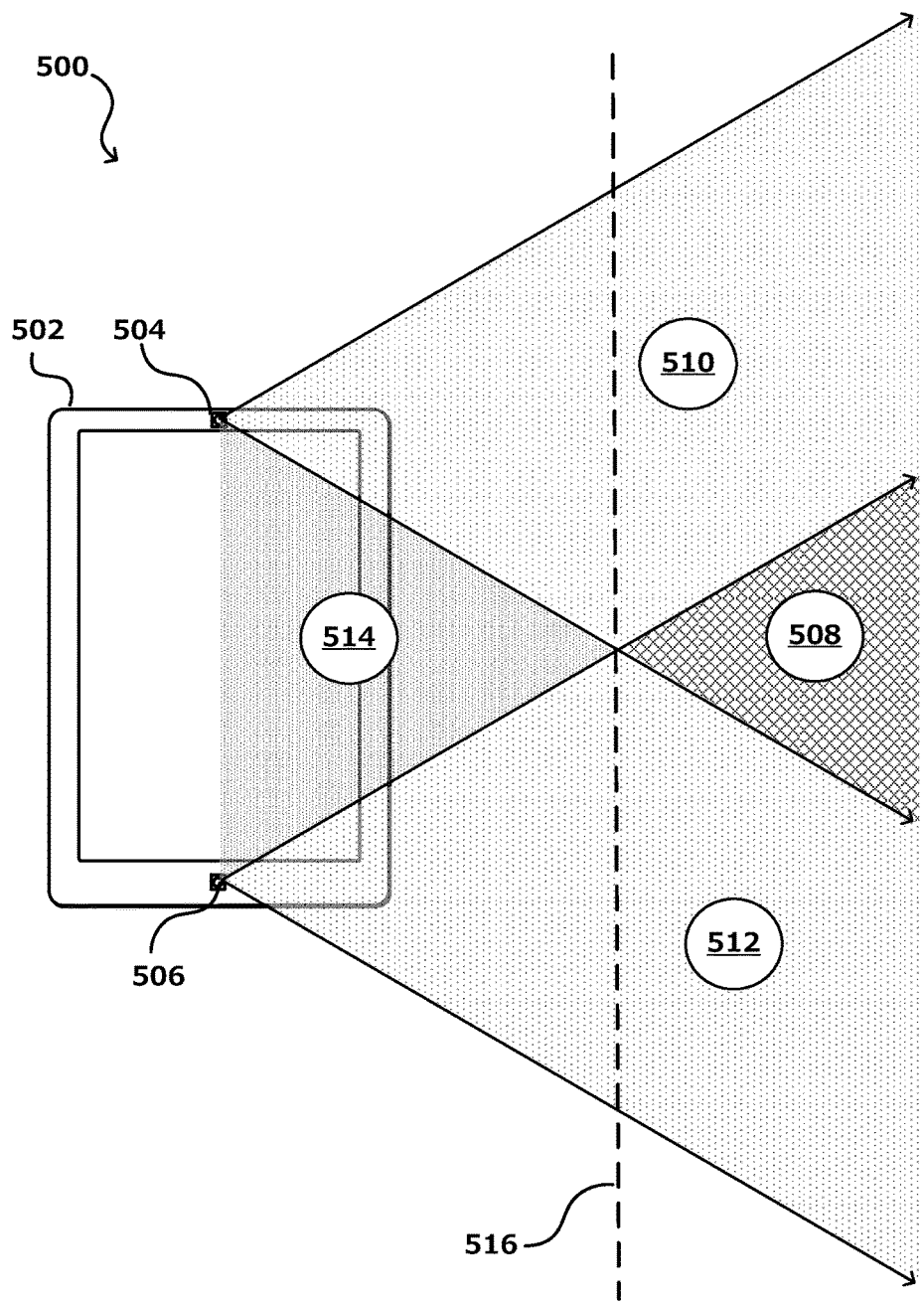
FIG. 5 illustrates example regions viewable by a pair of cameras that can be used in accordance with various embodiments.

In accordance with various embodiments, disparity information determined from stereo imaging can be used to determine whether two objects are separated by at least a threshold distance (e.g., D2 in FIG. 3). For example, stereo imaging can be used to build a disparity map of the objects in the stereo images. In order for the disparity to be determined for an object, however, that object has to be visible in the image captured by each of the cameras. For example, FIG. 5 illustrates an example situation 500 where a pair of matched cameras (504, 506) of a computing device 502 is capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 508 or region that is a distance from the device 502. Using conventional stereo imaging approaches, anything closer to the device than this overlap zone 508 will not be able to have disparity information determined, as the object would be seen by at most one of the cameras. An object in a zone 514 close to the device and between the cameras 504, 506 will not be seen by either camera and thus cannot be included in the disparity information (unless estimated from previous measurements and motion tracking, for example). There are two zones 510, 512 where an object can only be seen by one of the cameras 504, 506. Again, disparity information cannot be calculated for items in either of these zones. The effect of these zones decreases with distance, such that past a certain distance (e.g., a meter or so for certain devices) the fields of view of the cameras substantially overlap. For objects within the zone 508 viewable by both cameras 504, 506, the relative disparities can be indicative of distances from the camera, even if actual distances are not calculated. Thus, for objects having disparities that differ by more than a minimum threshold, for example, it can be possible to designate one of the objects as being in front of the other. For objects that have more than a specified threshold difference in disparity, for example, those objects can be designated as being in different planes or regions, such as a foreground, midground, and background, among others. As described, a reliable computation of the fundamental matrix includes determining a foreground and a background object separated by a threshold distance.

As an example, FIGS. 6(a) and 6(b) illustrate images 600, 620 that could be captured using stereo cameras. As can be seen, objects are slightly offset in one image with respect to the other. FIG. 6(c) illustrates an example combination image 640 highlighting the relative position and/or relative difference in disparity of those objects in the captured images 600, 620. As illustrated, objects closest to the camera, such as the user's face or head, have the greatest amount of disparity, or offset between images. Objects in the background, such as a painting on the wall, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate. It should be further understood, that detecting the foreground object and the background object can occur over multiple frames, and is not limited to one frame. For example, the foreground object can be detected in one frame, while the background object can be detected in a later frame.

FIG. 6(d) illustrates an example plot 600 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can select a distance past which objects are to be considered background objects, which can correspond to a small number of disparity levels to be analyzed. For example, a user providing motion input for a virtual keyboard of a smart phone might typically provide input within thirty-five centimeters of the device. Accordingly, the device for that application might set a threshold of thirty-five centimeters for background separation. By examining the disparity relationship curve 660 or relationship, the device (or an application or user of the device) can determine that the amount of disparity at thirty-five centimeters for the configuration parameters of the current device (e.g., camera resolution, camera separation, field of view, etc.) is twenty pixels of separation between images. Using this information, the device can analyze objects in the stereo images, and any objects having twenty pixels of disparity or less can be determined to be background images. Any remaining images can be foreground images. As illustrated in the FIG. 6(d), the fewer levels of disparity for the background objects can significantly reduce that the amount of processing of the image that is needed. Although likely more processor intensive, and likely to exclude features seen only by a single camera, another approach would be to select portions of the image that have more than the threshold amount of disparity as foreground images. Various other such approaches can be used as well.

In one example, an application can designate that anything within one meter of the device should be determined to be a foreground object. In another embodiment, an application can determine the distance to a feature of the user and make some factor of that distance, such as 1.25×, the distance cutoff. The actual value of the disparity threshold then can be calculated using that designation with information about the computing device capturing the image information. For example, the amount of disparity, D, at a given distance, d, can be given by:

$$D = \frac{f \times B}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. For any object in the images that has a disparity of less than twenty pixels, that object can be considered a background object.

In at least some embodiments, an object must exhibit one or more other properties than being closest to the camera in order to be selected as a foreground object. For example, the object might have to be within a specified distance range, such as a range that is not too close to the camera or too far from the camera. If an object is detected that is less than a foot away from a camera, for example, and thus would not be able to be brought into focus for some cameras, that object might not be selected as an intended foreground object. Similarly, if the object is far enough away that the disparity will not be appreciably different from the background images, that object might not be selected as a foreground image. The object might also potentially have to be in or near a central region of the image. Such placement indicates that the object is likely of interest to the user, and prevents the identification of things like branches or furniture near the edges of the image from being identified as objects to be used for focusing or blur reduction. Other information might be used as well, such as the need to identify or recognize a face or head for certain applications in order to identify an object as a foreground object.

Systems and methods in accordance with various embodiments take advantage of the relationship between disparity and distance to objects in the foreground from objects in the background of an image (or a pair of images, video such as in multiple frames of the image, etc.). As described, a reliable computation of the fundamental matrix includes determining a foreground and a background object separated by a threshold distance. For example, as with FIG. 6, FIGS. 7(a) through 7(f) illustrate left 700 and right 710 images that, when combined, show greater amounts of disparity for objects in the foreground, such as the user's face or head 722, than objects in the background, such as the painting 724 (as shown in image 720). However, unlike the situation in FIG. 6, at least one camera obtaining the images is misaligned, and in order for image 720 to have the desired appearance in the captured stereo image, the cameras have to be aligned such that the objects are properly positioned in each image to provide the desired depth information. Because at least one camera is misaligned, image 720 does not include a proper amount of disparity information, and thus, the 3D view of the objects will be impacted (e.g., distorted).

Figure 7A:
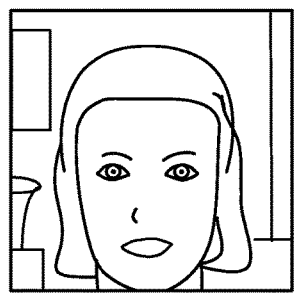
FIGS. 7(a), 7(b), 7(c), 7(d), 7(e), and 7(f) illustrate example images that can be analyzed for rectifying or otherwise accounting for variations in images captured by a pair of stereo cameras in accordance with various embodiments.
Figure 7B:
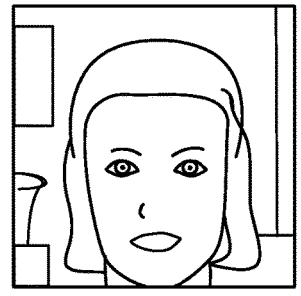
Figure 7C:
Figure 7D:
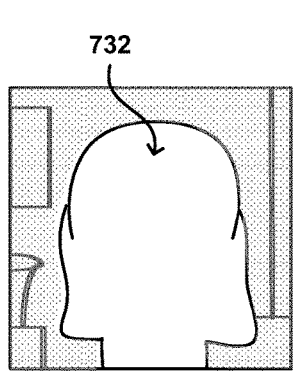
Figure 7E:
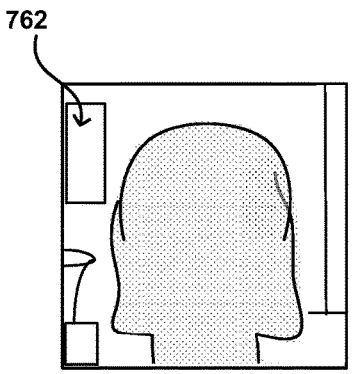
Figure 7F:
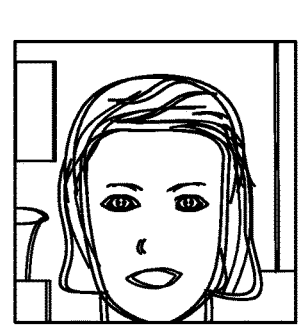

Accordingly, as described, misalignment can be compensated through software and/or image processing. In one such approach, one or more foreground and background objects are identified based on distance information using one or more images. Once the foreground object has been identified, an approximate region 732 or location of that object can be identified, such as is represented in FIG. 7(d). This region can be represented by a shape, a bounding box, a set of feature points, and the like. The set of feature points, in some embodiments, can include the corners or intersections of the object, which can be extracted by a corner detection algorithm, such as a Harris corners detection algorithm. In at least some embodiments, feature points for the object can be determined as is known for object tracking. In some embodiments, certain set of objects are frequently expected to be seen, e.g., faces in a frontal stereo camera pair. In such a case, face or other well-known detectors can be used to detect feature points of the face represented in the images. Similarly, in accordance with an embodiment, once the background object has been identified, an approximate region 762 or location of that object (e.g., the painting) can be identified, such as represented in FIG. 7(e). As described in regard to FIG. 7(d), this region can be represented by a shape, a bounding box, a set of feature points, among others, and the feature points for the object can be determined as is known for object tracking.

In some situations, the feature points may not be adequately distributed across the image scene. Accordingly, in accordance with an embodiment, a semi-supervised approach can be implemented to ensure that the feature points are adequately distributed across the image frame. In accordance with this approach, to generate evenly distributed feature points, the device is rotated around an axis as images are obtained with the cameras. As the device is rotated, both cameras undergo the same rotation, as does the obtained image(s). Because the scene remains the same, the same feature rich areas are detected from the images taken from the cameras. As described above, feature point detectors can then be used to detect the feature points, irrespective of orientation. In this way, feature points can be detected in the same portions of the scene, only in a different locations (e.g., as a consequence of the rotation). These feature points can be matched by rotation invariant feature point detectors (such as SIFT, SURF, etc.). Thus, each pair of stereo images generates feature point matches in different portions of the image (even though the features are typically from the same regions of the scene). Accordingly, by rotating a stereo camera pair facing a feature rich scene, feature point matches can be obtained that span the entire frame.

The feature points obtained from the object in the foreground (e.g., the head) and the object obtained in the background (e.g. the painting) for each image can be used to rectify or otherwise account for variations in images captured by a pair of stereo cameras. For example, upon detecting the feature points in each object, e.g., by using one of a number of detection algorithms, such as scale-invariant feature transform (SIFT), speeded up robust features (SURF), among others, the fundamental matrix or other such computation can be computed using one of, or a combination of, normalized 8-point method, random sample consensus (RANSAC), least median squares, among others). There are many approaches known and/or used for computing the fundamental matrix or other such computation, such that details of such a computation will not be discussed herein in detail. It should be further noted that any approach that can determine the relationship between corresponding image points can be used in the embodiments described herein. Additionally, it should be understood that detecting the foreground object and the background object can occur over multiple frames, and is not limited to one frame. For example, the foreground object can be detected in one frame, while the background object can be detected in a later frame The computation of the fundamental matrix can then be used to represent the relationship between feature points in the stereo images, where the features are projections of the same scene element. Given a feature point in one image, its corresponding point must lie on an epipolar line in the other image, allowing for the detection of incorrect correspondences. In this way, when the epipolar geometry is not in this ideal form, the image pairs can be adjusted to make corresponding points lie on the same scan lines. This process is known as image rectification, and can be accomplished by applying 2-D projective transformations on each image. For example, offset values for the feature points can be determined, and in at least some embodiments, a model (e.g., a "rectifying model") of the camera(s) capturing that image can be generated. The rectifying model or mappings can include transforms or adjustments to be made to an image captured by one or both of the cameras in order to reduce misalignment. For example, based at least in part upon the model or mappings, the appropriate image adjustments can be made to align the pair of cameras (e.g., the left and right stereo cameras). For example, each point on a grid can be located in an image captured by each camera, and an offset or function determined for matching these locations in the image, with respect to the expected amount of disparity between the images for the location of the calibration object. Further, in some embodiments, an overall adjustment such as an amount of translation and/or rotation can be determined that should be applied to an image captured by at least one of the cameras. For example, if one of the cameras is determined to be angled at 0.5 degrees with respect to the other camera, images captured by one of the cameras can be rotated by 0.5 degrees to align the images. Similarly, if there is a determined translation or offset in terms of pixel values, distances, etc., at least one of the images can be shifted to compensate for the offset.

Upon computing the fundamental matrix, and once a subsequent stereoscopic image is captured using the pair of cameras, the model obtained therefrom can be applied to each image to account for misalignment effects due to the misaligned stereo camera pair before providing the stereoscopic image for display. For example, illustration 760 in FIG. 7(*f*) shows that applying the model or mapping to a subsequently captured image can account for, or remove, the offset due to the misaligned cameras.

As discussed, however, stereo imaging might not be available on all devices, or may not be sufficient for all conditions. For example, stereo imaging typically requires a minimum amount of contrast in order to be able to correlate the objects in the images captured from each camera. Accordingly, approaches in accordance with various embodiments can utilize different approaches, and/or a combination of approaches, to provide distance determinations useful in separating foreground objects from background objects. For example, a computing device might use a light sensor or other such component to determine an amount of light and/or image contrast near the computing device. If a sufficient amount of contrast is present, the device can utilize a stereo imaging approach. If there is not a sufficient amount of contrast, however, the device can attempt to use an alternative (or additional) approach to making distance determinations. If stereo imaging is not available, the device might instead rely on such an approach.

For example, a device can utilize infrared radiation (IR) to attempt to separate foreground objects from background objects in at least some embodiments, where the device can capture one image while emitting IR radiation and another image without IR radiation. Objects in the foreground will show stronger differences as a result of the illumination between figures, which can facilitate the identification of foreground objects. In other embodiments, a single image can be captured and the relative brightness of objects used to separate objects into foreground and background objects or regions, although a single image may not be as reliable as intensity differences can also vary based on color, surface texture, reflectivity, and other such factors. Multi-image based IR-based approaches can suffer from motion effects, however, as the images are captured at different points in time. Stereo imaging captures image information at the same time, such that there is little to no effect due to motion, other than blur or other such effects. IR-based approaches can produce relatively crisp images, even when there is an amount of motion, but do not work well in bright sunlight, where stereo imaging tends to perform well. IR-based approaches work well up to thirty centimeters, for example, but stereo approaches work for longer distances, such as up to three meters, but have blind zones when very close to the device. Stereo and IR based approaches thus complement each other, and can be used together advantageously in at least some embodiments for at least a certain range of conditions. Thus, a device can attempt to determine one or more environmental conditions, such as an amount of light or motion, and can select to use a stereo based approach or an IR based approach, or a combination of both. An advantage to using a combination of approaches is that each individual approach might only give a result with 80% confidence, but using them together can result in a confidence of about 96 percent in at least some embodiments.

In at least some embodiments, an ultrasonic sensor or other distance determining sensor can be used to attempt to determine relative distances to objects represented in an image. Using such an approach, the differences in time-of-flight, as known for distance determinations, can be used to determine relative, if not absolute, differences in distance. Such approaches can also be used to determine or identify foreground and background objects. Various other distance determining approaches can be utilized as well within the scope of the various embodiments.

In some embodiments, a computing device might utilize one or more motion sensors, such as an electronic gyroscope or inertial sensor, to attempt to assist with location determinations. For example, a rotation of a device can cause a rapid shift in objects represented in an image, such that image stabilization might not be attempted if the amount of motion exceeds a determined amount. For smaller movements, the information from the motion sensors can be used to provide a starting point for the feature detection in a subsequent image, which can increase the speed of the detection process and reduce the amount of processing and power required. Various other types of movement or motion information can be used as well within the scope of the various embodiments.

Accordingly, any one of these or other related approaches can be used to attempt to identify one or more foreground and background objects based on one or more sources of distance information, and analyze the portions of the images (including frames or portions of video) corresponding to the foreground and background object(s) to attempt to identify one or more feature points from the representation of the object(s) in the images. Once the foreground and background object(s) have been located, feature points for the objects can be determined, and the feature points can be used in various calibration processes, such as one using the computation of the fundamental matrix, to enable any misalignment between cameras to be determined, which can then be addressed when processing images captured by those cameras, as described above.

Figure 8:
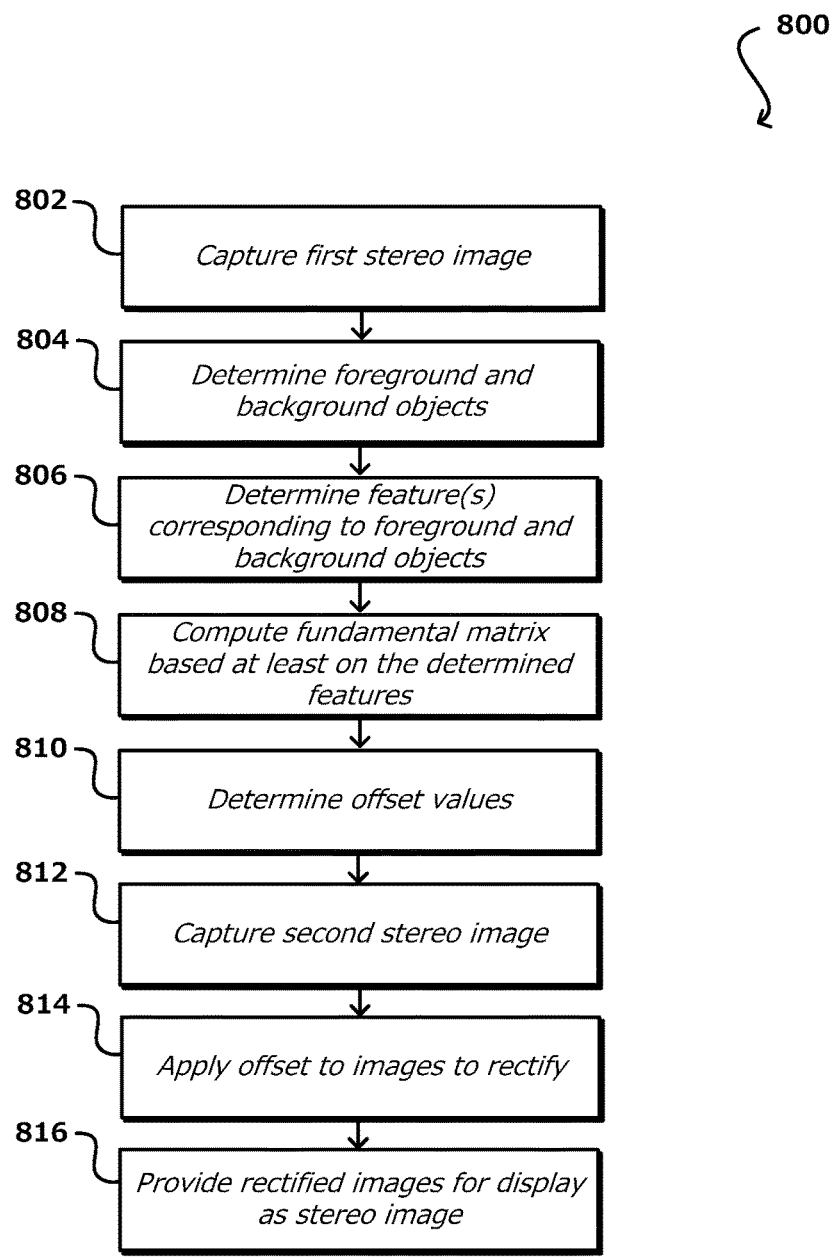
FIG. 8 illustrates an example computing process for rectifying or otherwise accounting for variations in images captured by a pair of stereo cameras in accordance with various embodiments.

FIG. 8 illustrates an example process 800 for rectifying or otherwise accounting for variations in images captured by a pair of stereo cameras that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, at least a first image is captured 802 along with distance data. As discussed, the distance data can be obtained by capturing a second image from a stereoscopic pair and using differences in disparity to separate objects into at least foreground and background objects. In other embodiments, ultrasonic sensors, infrared intensity differences, or other mechanisms can be used, as discussed elsewhere herein, to determine at least relative differences in distance between two or more objects represented in at least the first image. It should be understood that detecting the foreground object and the background object can occur over multiple frames, and is not limited to one frame. For example, the foreground object can be detected in one frame, while the background object can be detected in a later frame.

Once the distance information is obtained, one or more foreground objects and background objects can be determined 804 using the difference in distance data, along with general segmentation algorithms or other such approaches. As discussed, this can include separating objects into regions of distance when those objects differ by at least a specified distance or amount of disparity, etc. Once a foreground and background object is identified, one or more features of that foreground and background object can be determined 806, such as by determining a shape, bounding box, or center point (e.g., a centroid), or identifying a plurality of feature points representative of the object. The extent of the foreground object can be identified, in at least some embodiments, using edge data, gradient-based information, or color information, among other such options. The information about the foreground and background object then can be stored, either in resident memory or persistent storage, among other such options.

The feature points obtained from the object in the foreground and the object obtained in the background for each image can be used to rectify or otherwise account for variations in images captured by a pair of stereo cameras. For example, upon detecting the feature points in each object, e.g., by using one of well-known approaches (e.g., SIFT, SURF, etc.) the fundamental matrix or other such computation can be computed 808 (using one of, or a combination of, normalized 8-point method, random sample consensus (RANSAC), least median squares, among others). As described, the fundamental matrix can be used to represent the relationship between feature points in the stereo images, where the features are projections of the same scene element. Based on the computation of the fundamental matric, offset values for the feature points can be determined 810, and in at least some embodiments, a model (e.g., a "rectifying model") of the camera(s) capturing that image can be generated. As mentioned, the rectifying model or mappings can include transforms or adjustments to be made to an image captured by one or both of the cameras in order to account for misalignment of the stereo camera pair. Once a subsequent stereoscopic image is captured 812 using the pair of cameras, the offset values or model can be applied 814 to each image to remove distortion and misalignment effects from each image before providing 816 the stereoscopic image for display.

Figure 9:
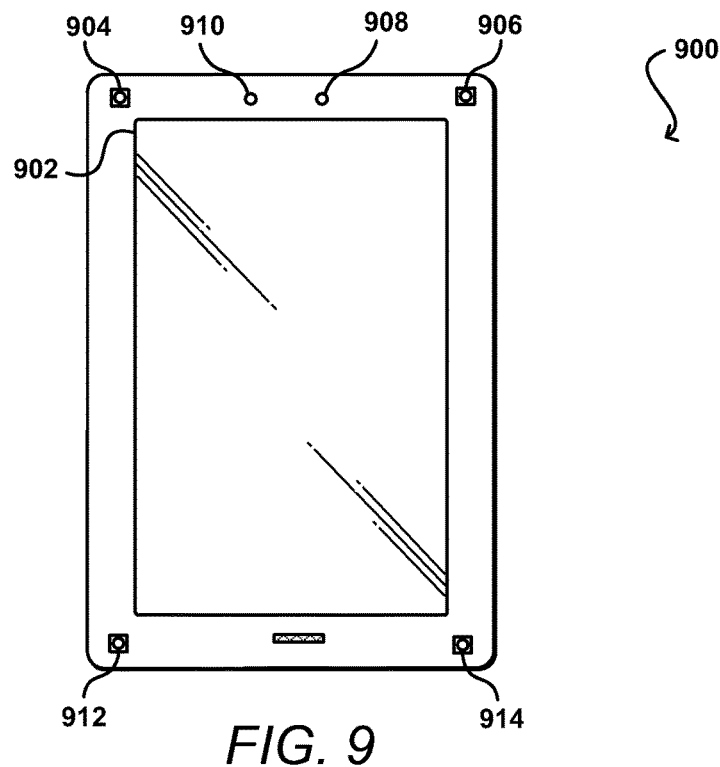
FIG. 9 illustrates an example computing device that can be used in accordance with various embodiments.

FIG. 9 illustrates an example computing device 900 that can be used to perform methods in accordance with various embodiments discussed and suggested herein. In this example, the device has four image capture elements 904, 906, 912, 914 positioned at various locations on the same side of the device as a display element 902, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 908 is included that can be used to determine an amount of light in a general direction of objects to be captured and at least one illumination element 910, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 10:
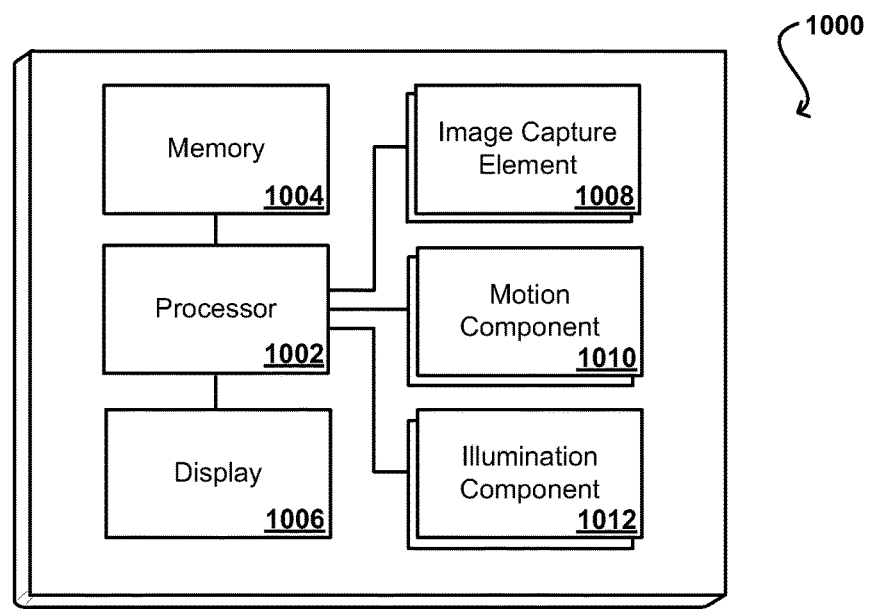
FIG. 10 illustrates an example configuration of components of a computing device such as that illustrated in FIG. 9.

In order to provide various functionality described herein, FIG. 10 illustrates an example set of basic components of a computing device 1000, such as the device 900 described with respect to FIG. 9. In this example, the device includes at least one central processor 1002 for executing instructions that can be stored in at least one memory device or element 1004. As would be apparent to one of ordinary skill in the art, the device can include many types of memory, data storage or non-transitory computer-readable storage media, such as a first data storage for program instructions for execution by the processor 1002, the same or separate storage can be used for images or data, a removable storage memory can be available for sharing information with other devices, etc. The device typically will include some type of display element 1006, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 1008, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 1010, such as an electronic gyroscope used to determine motion of the device for assistance in input determination. The device also can include at least one illumination element 1012, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Figure 11:
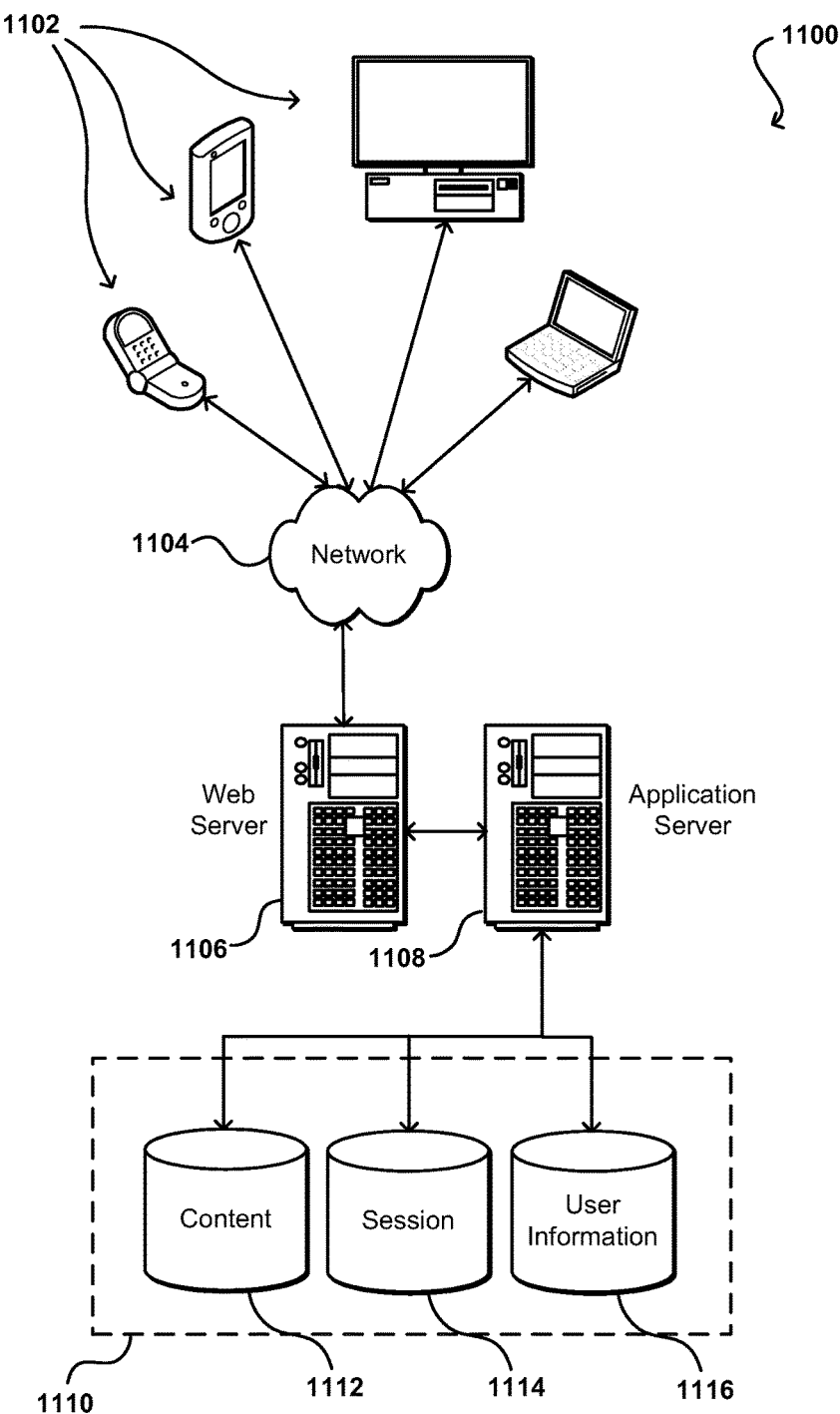
FIG. 11 illustrates an example environment in which various embodiments can be implemented.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, UDP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft® Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of rectifying a stereoscopic pair of cameras for stereoscopic image capture, comprising:
    capturing, using the stereoscopic pair of cameras including a first camera and a second camera, a first image using the first camera and a second image using the second camera;
    analyzing, using at least one processor of a computing device, the first image and the second image to determine a presence of one or more objects and an amount of disparity for at least a portion of the one or more objects;
    determining, based at least in part on an environmental condition, a first suitability of a stereo image based segmenting technique;
    determining, based at least in part on the environmental condition, a second suitability of an infrared (IR) based segmenting technique;
    identifying a selected segmenting technique from the stereo image based segmenting technique and the IR based segmenting technique, based on the first suitability and the second suitability;
    segmenting, using the selected segmenting technique, the first image and the second image into at least a foreground portion and a background portion, the foreground portion including a foreground object and the background portion including a background object, the foreground object and the background object determined to be separated by at least a threshold distance as based at least in part on the amount of disparity;
    locating, for each of the first image and the second image, one or more feature points for each of the foreground object and the background object, each feature point of the one or more feature points represents a distinctive point that identifies a corresponding object;
    determining a mapping of the feature points of the foreground object and the feature points of the background object in the first image to corresponding feature points in the foreground object and feature points in the background object in the second image;
    generating a rectifying model based at least in part upon the mapping; and
    applying the rectifying model to one or more subsequent images captured by at least one of the first camera or the second camera to reduce misalignment in the one or more subsequent images, data in the one or more subsequent images capable of being used to generate one or more stereoscopic images.

2. The computer-implemented method of claim 1, wherein determining a mapping includes computing a fundamental matrix based at least in part on the feature points of the foreground object and the feature points of the background object in the first image and corresponding feature points in the foreground object and feature points in the background object in the second image.

3. The computer-implemented method of claim 1, further comprising:
    determining that a region of the first image is positioned within a threshold distance from the computing device; and
    assigning the region as the foreground portion.

4. The computer-implemented method of claim 1, further comprising:
  determining that a difference in disparity values for the one or more objects exceeds a minimum threshold before segmenting the first image into at least a foreground portion and a background portion.

5. A computer-implemented method, comprising:
  obtaining a first image and a second image, the first image captured using a first camera and the second image captured using a second camera, the second camera separated a distance from the first camera on a portable computing device;
  determining, based at least in part on an environmental condition, a first suitability of a stereo image based segmenting technique;
  determining, based at least in part on the environmental condition, a second suitability of an infrared (IR) based segmenting technique;
  identifying a selected segmenting technique from the stereo image based segmenting technique and the IR based segmenting technique, based on the first suitability and the second suitability;
  segmenting, using the selected segmenting technique, the first image into at least a first foreground portion and a first background portion based at least in part upon distance information for at least two objects represented in the first image;
  segmenting, using the selected segmenting technique, the second image into at least a second foreground portion and a second background portion based at least in part upon distance information for the at least two objects represented in the second image;
  identifying, in the first image, a first foreground pixel location of at least one feature of a foreground object corresponding to the first foreground portion, the at least one foreground feature represents a first distinctive point that identifies the foreground object;
  identifying, in the second image, a second foreground pixel location of the at least one feature of the foreground object;
  identifying, in the first image, a first background pixel location of at least one feature of a background object corresponding to the first background portion, the at least one background feature represents a second distinctive point that identifies the background object;
  identifying, in the second image, a second background pixel location of the at least one feature of the background object;
  determining a mapping of:
    the first foreground pixel location and the second foreground pixel location, and
    the first background pixel location and the second background pixel location; and
  storing the mapping for reducing misalignment effect from one or more subsequent pairs of images captured by at least one of the first camera or the second camera, the one or more subsequent pairs of images capable of being used to generate one or more stereoscopic images.

6. The computer-implemented method of claim 5, further comprising:
  determining disparity information for the at least two objects using image data captured by a pair of stereoscopic cameras, the distance information being obtained by analyzing differences in the disparity information for the at least two objects.

7. The computer-implemented method of claim 5, further comprising:
  obtaining the distance information using at least one distance sensor of the portable computing device, the at least one distance sensor configured to obtain the distance information for the at least two objects.

8. The computer-implemented method of claim 5, further comprising:
  capturing infrared (IR) radiation reflected from the at least two objects, the IR radiation being emitted by an IR emitter of the portable computing device, the distance information being obtained by determining a relative intensity of the IR radiation reflected from each of the at least two objects.

9. The computer-implemented method of claim 5, further comprising:
  generating a rectifying model based at least in part upon the mapping; and
  applying the rectifying model to one or more subsequent images captured by at least one of the first camera or the second camera to reduce misalignment in the subsequent images, data in the one or more subsequent images capable of being used to generate one or more stereoscopic images.

10. The computer-implemented method of claim 5, wherein determining a mapping includes computing a fundamental matrix based at least in part on the feature points of the foreground object and the feature points of the background object in the first image and corresponding feature points in the foreground object and feature points in the background object in the second image.

11. The computer-implemented method of claim 10, wherein the fundamental matrix is computed using at least one of a normalized 8-point method, a random sample consensus (RANSAC) method, or a least median squares method.

12. The computer-implemented method of claim 5, wherein the at least one feature of the foreground object and the at least one feature of the background object in each of the first image and the second image are detected using at least one of facial feature detection algorithms, scale-invariant feature transform (SIFT) algorithms, speeded up robust features (SURF) algorithms, or corner detection algorithms, edge detection algorithms.

13. The computer-implemented method of claim 5, further comprising:
  causing each of the first image and the second image to be rotated a predetermined amount;
  in response to rotating the first image and the second image the predetermined amount, identifying at least one feature of the foreground object and at least one feature of the background object in each of the first image and the second image; and
  determining the mapping based at least on the rotated at least one feature of the foreground object and at least one feature of the background object in each of the first image and the second image.

14. The computer-implemented method of claim 5, further comprising:
  adjusting a display of the one or more subsequent pairs of images captured by the first camera and the second camera on a display element of the portable computing device to counteract the misalignment effect due to at least one of the first camera or the second camera.

15. The computer-implemented method of claim 5, wherein the at least one feature of the foreground object and the background object includes at least one of a center point, a feature point, a contour, or a shape.

16. A computing device, comprising:
at least one device processor;
a first camera having a first field of view;
a second camera separated a distance on the computing device from the first camera, the second camera having a second field of view that at least partially overlaps the first field of view; and
a memory device including instructions that, when executed by the at least one device processor, cause the computing device to:
obtain a first image and a second image, the first image captured using a first camera and the second image captured using a second camera, the second camera separated a distance from the first camera on a portable computing device;
determine, based at least in part on an environmental condition, a first suitability of a stereo image based segmenting technique;
determine, based at least in part on the environmental condition, a second suitability of an infrared (IR) based segmenting technique;
identify a selected segmenting technique from the stereo image based segmenting technique and the IR based segmenting technique, based on the first suitability and the second suitability;
segment, using the selected segmenting technique, the first image into at least a first foreground portion and a first background portion based at least in part upon distance information for at least two objects represented in the first image;
segment, using the selected segmenting technique, the second image into at least a second foreground portion and a second background portion based at least in part upon distance information for at least two objects represented in the second image;
identify, in the first image, a first foreground pixel location of at least one feature of a foreground object corresponding to the first foreground portion, the at least one foreground feature represents a first distinctive point that identifies the foreground object;
identify, in the second image, a second foreground pixel location of the at least one feature of the foreground object;
identify, in the first image, a first background pixel location of at least one feature of a background object corresponding to the first background portion, the at least one background feature represents a second distinctive point that identifies the background object;
identify, in the second image, a second background pixel location of the at least one feature of the background object;
determine a mapping of:
the first foreground pixel location and the second foreground pixel location, and
the first background pixel location and the second background pixel location; and
store the mapping for reducing misalignment effect from one or more subsequent pairs of images captured by at least one of the first camera or the second camera, the one or more subsequent pairs of images capable of being used to generate one or more stereoscopic images.

17. The computing device of claim 16, wherein the instructions when executed further cause the computing device to:
determine disparity information for the at least two objects using image data captured by a pair of stereoscopic cameras, the distance information being obtained by analyzing differences in the disparity information for the at least two objects, or
obtain the distance information using at least one distance sensor of the portable computing device, the at least one distance sensor configured to obtain the distance information for the at least two objects.

18. The computing device of claim 16, further comprising:
an infrared (IR) emitter configured to emit IR radiation; and
an IR sensor configured to capture IR radiation reflected from the at least two objects, wherein the distance information is obtained by determining a relative intensity of the IR radiation reflected from each of the at least two objects.

19. The computing device of claim 18, wherein the IR sensor is configured to capture two images of the at least two objects, one with the IR emitter emitting IR radiation and one without the IR emitter emitting IR radiation, the relative intensities being determined further based upon differences between IR intensities detected between the two images of the at least two objects.

20. The computing device of claim 16, wherein the instructions when executed further cause the computing device to:
generate a rectifying model based at least in part upon the mapping; and
apply the rectifying model to one or more subsequent images captured by at least one of the first camera or the second camera to reduce misalignment in the subsequent images, data in the one or more subsequent images capable of being used to generate one or more stereoscopic images.

21. The computing device of claim 16, wherein determining a mapping includes computing a fundamental matrix based at least in part on the feature points of the foreground object and the feature points of the background object in the first image and corresponding feature points in the foreground object and feature points in the background object in the second image.

22. A non-transitory computer readable storage medium storing one or more sequences of instructions executable by one or more processors to perform a set of operations comprising:
obtaining a first image and a second image, the first image captured using a first camera and the second image captured using a second camera, the second camera separated a distance from the first camera on a portable computing device;
determining, based at least in part on an environmental condition, a first suitability of a stereo image based segmenting technique;
determining, based at least in part on the environmental condition, a second suitability of an infrared (IR) based segmenting technique;
identifying a selected segmenting technique from the stereo image based segmenting technique and the IR based segmenting technique, based on the first suitability and the second suitability;
segmenting, using the selected segmenting technique, the first image into at least a first foreground portion and a first background portion based at least in part upon distance information for at least two objects represented in the first image;

segmenting, using the selected segmenting technique, the second image into at least a second foreground portion and a second background portion based at least in part upon distance information for at least two objects represented in the second image;

identifying, in the first image, a first foreground pixel location of at least one feature of a foreground object corresponding to the first foreground portion, the at least one foreground feature represents a first distinctive point that identifies the foreground object;

identifying, in the second image, a second foreground pixel location of the at least one feature of the foreground object;

identifying, in the first image, a first background pixel location of at least one feature of a background object corresponding to the first background portion, the at least one background feature represents a second distinctive point that identifies the background object;

identifying, in the second image, a second background pixel location of the at least one feature of the background object;

determining a mapping of:
the first foreground pixel location and the second foreground pixel location, and
the first background pixel location and the second background pixel location; and storing the mapping for reducing misalignment effect from one or more subsequent pairs of images captured by at least one of the first camera or the second camera, the one or more subsequent pairs of images capable of being used to generate one or more stereoscopic images.

23. The non-transitory computer-readable storage medium of claim 22, further comprising instructions executed by the one or more processors to perform the operations of:

determining disparity information for the at least two objects using image data captured by a pair of stereoscopic cameras, the distance information being obtained by analyzing differences in the disparity information for the at least two objects; and obtaining the distance information using at least one distance sensor of the portable computing device, the at least one distance sensor configured to obtain the distance information for the at least two objects; or capturing infrared (IR) radiation reflected from the at least two objects, the IR radiation being emitted by an IR emitter of the portable computing device, the distance information being obtained by determining a relative intensity of the IR radiation reflected from each of the at least two objects.

24. The non-transitory computer-readable storage medium of claim 22, further comprising instructions executed by the one or more processors to perform the operations of:

causing each of the first image and the second image to be rotated a predetermined amount;

in response to rotating the first image and the second image the predetermined amount, identifying at least one feature of the foreground object and at least one feature of the background object in each of the first image and the second image; and determining the mapping based at least on the rotated at least one feature of the foreground object and at least one feature of the background object in each of the first image and the second image.

25. The non-transitory computer-readable storage medium of claim 24, further comprising instructions executed by the one or more processors to perform the operations of:

adjusting a display of the one or more subsequent pairs of images captured by the first camera and the second camera on a display element of the portable computing device to counteract the misalignment effect due to at least one of the first camera or the second camera.

26. The computer-implemented method of claim 1, wherein the amount of disparity is determined at the feature points, and the one or more objects are determined based at least in part on differences in the determined amount of disparity.

* * * * *